United States Patent
Funk et al.

(10) Patent No.: US 7,866,186 B2
(45) Date of Patent: Jan. 11, 2011

(54) DEVICE FOR PRODUCING A GAS CUSHION

(75) Inventors: Dieter Funk, Witten (DE); Joachim Pilz, Oer-Erkenschwick (DE); Peter Michels, Sprockhovel (DE)

(73) Assignee: Pilkington Automotive Deutschland GmbH, Witten (DE)

( * ) Notice: Subject to any disclaimer, the term of this patent is extended or adjusted under 35 U.S.C. 154(b) by 290 days.

(21) Appl. No.: 10/551,286

(22) PCT Filed: Mar. 22, 2004

(86) PCT No.: PCT/EP2004/002979
§ 371 (c)(1),
(2), (4) Date: Jul. 6, 2006

(87) PCT Pub. No.: WO2004/085325
PCT Pub. Date: Oct. 7, 2004

(65) Prior Publication Data
US 2006/0277947 A1 Dec. 14, 2006

(30) Foreign Application Priority Data
Mar. 28, 2003 (DE) ................. 103 14 408

(51) Int. Cl.
*C03B 40/04* (2006.01)
*C03B 35/24* (2006.01)
(52) U.S. Cl. .................... 65/182.2; 65/182.1
(58) Field of Classification Search ........... 65/181.1, 65/181.2, 25.1; 34/359; 406/86, 88
See application file for complete search history.

(56) References Cited

U.S. PATENT DOCUMENTS 3,374,078 A * 3/1968 Wright .............. 65/182.2

(Continued)

FOREIGN PATENT DOCUMENTS

EP    0 398 759 A2    11/1990

(Continued)

OTHER PUBLICATIONS

Machine Translation of JP 2000-247663.*

(Continued)

*Primary Examiner*—Eric Hug
*Assistant Examiner*—Cynthia Szewczyk
(74) *Attorney, Agent, or Firm*—Buchanan Ingersoll & Rooney PC

(57) ABSTRACT

The gas cushion serves to support a preheated glass sheet and is produced by a chamber, which is connected to a source (21) of compressed gas. The upper wall (10) of the chamber is adapted to the shape of the glass sheet and has a plurality of apertures for the passage of gas in the form of nozzles (14), which comprise an entry bore (22) and, following thereupon, a progressively widening exit hole (16) with a nozzle exit area (15). The upper wall (10) of the chamber has a greater degree of perforation (sum of the nozzle exit areas (15) in relation to the total area of the respective zone) in its edge zone (12, 13) than in its central zone (11). The nozzles ensure that no jet marks can arise. The gas of the gas cushion can also flow out undisturbed at the side, so that no cooling edges are present and the occurrence of cooling shadows is accordingly avoided.

22 Claims, 5 Drawing Sheets

U.S. PATENT DOCUMENTS

Figure 1:
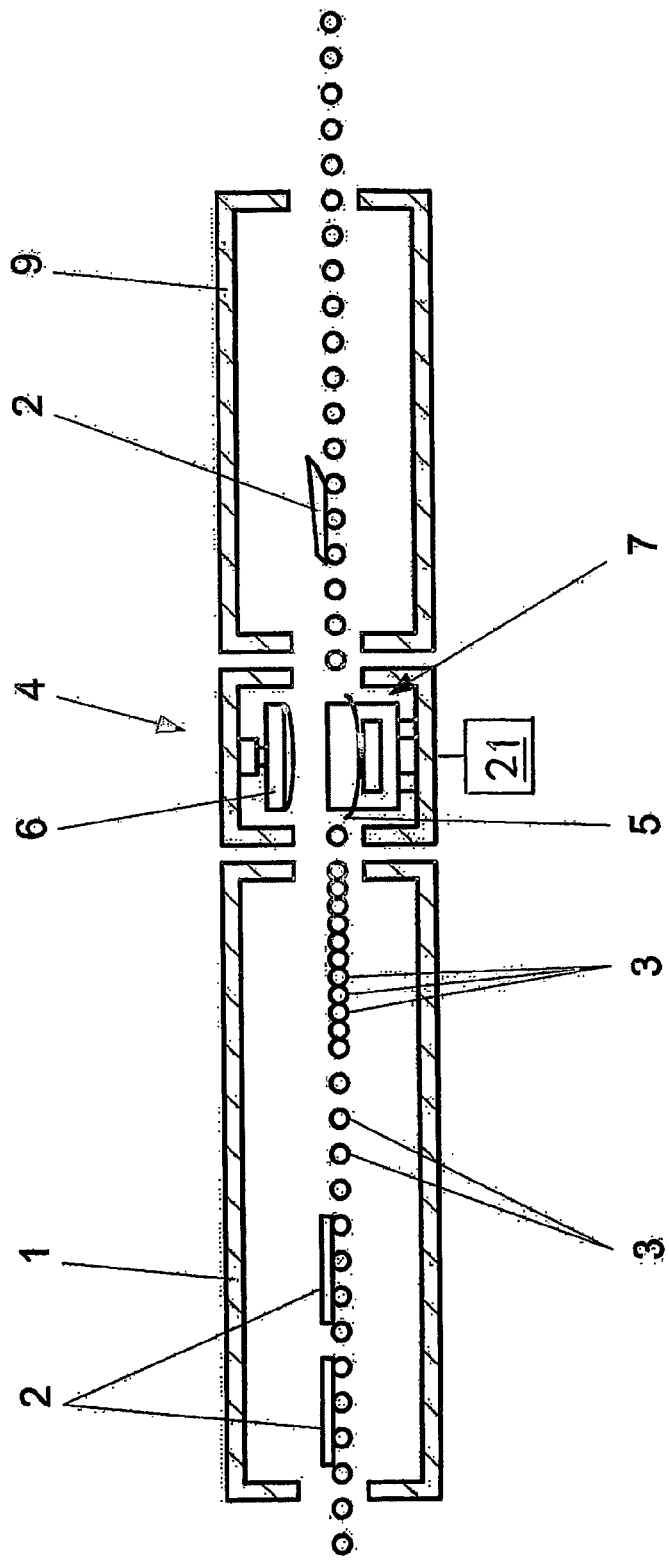

| | | | |
|---|---|---|---|
| 4,746,348 A | | 5/1988 | Frank |
| 4,952,227 A | | 8/1990 | Herrington et al. |
| 5,079,931 A | * | 1/1992 | Lehto et al. ............ 65/288 |
| 5,330,549 A | | 7/1994 | Carlomagno et al. |
| 5,336,288 A | | 8/1994 | Carlomagno et al. |
| 5,376,158 A | | 12/1994 | Shetterly et al. |
| 5,833,729 A | | 11/1998 | Meunier et al. |
| 5,857,358 A | | 1/1999 | De Vries, Jr. et al. |
| 5,938,810 A | | 8/1999 | De Vries, Jr. et al. |
| 6,227,008 B1 | | 5/2001 | Shetterly et al. |
| 2004/0226318 A1 | * | 11/2004 | Schwartz et al. ......... 65/182.2 |
| 2005/0061034 A1 | | 3/2005 | Boisselle et al. |

FOREIGN PATENT DOCUMENTS

| | | |
|---|---|---|
| EP | 0 523 016 | 1/1993 |
| EP | 0 523 016 A2 | 1/1993 |
| EP | 0 523 016 B1 | 1/1993 |
| EP | 0 530 211 B1 | 3/1993 |
| EP | 0 578 542 | 1/1994 |
| EP | 0 578 542 A1 | 1/1994 |
| EP | 0 578 542 B1 | 1/1994 |
| EP | 0 593 137 B1 | 4/1994 |
| EP | 0 593 138 B1 | 4/1994 |
| JP | 2000/247663 | 9/2000 |
| JP | 2000 247663 | 9/2000 |
| JP | 2001-158631 A | 6/2001 |

OTHER PUBLICATIONS

U.S. Appl. No. 10/551,284, filed Nov. 23, 2006, Funk et al. (in USPTO's IFW System).

English Translation of JP 2000-247663.

Official Action issued by the Japanese Patent Office in corresponding Japanese Patent Application No. 2006-504784, with English language translation.

* cited by examiner

DEVICE FOR PRODUCING A GAS CUSHION

The invention relates to a device for producing a gas cushion for supporting a preheated glass sheet, comprising a chamber connected to a source of compressed gas, the upper wall of which chamber is adapted in its external dimensions to the outline of the glass sheet and has a plurality of apertures for the passage of gas.

The device can be used wherever it is a matter of supporting a preheated glass sheet, for example a glass sheet that is to be toughened. The main area of use, however, is the production of bent laminated glass panels, in particular for the construction of motor vehicles. A laminated window for a vehicle normally comprises two plies of glass, wherein in use one ply forms the inner surface of the window (i.e. it faces towards the vehicle interior), and the other ply forms the outer or exterior surface of the window.

During manufacture of the window, a pair of glass sheets is heated up to the bending temperature in a preheating furnace and then conveyed to a press-bending station. Each member of the pair of sheets may be heated individually, e.g. inner and outer plies are conveyed separately through the furnace, possibly with the inner and outer plies in alternating sequence. Alternatively, the pair may be heated as a nested pair, i.e. with one ply (normally the inner ply) superposed on the other.

The device for producing the gas cushion forms a component of the press-bending station. The respective glass sheet, or nested pair of sheets, passes from the rollers of the preheating furnace onto the gas cushion and is brought to a halt here and also centred relative to the bending mould. If rollers were also to be used here, the unavoidable dwell time would lead to the formation of markings which would considerably impair the optical properties of the glass sheet.

The chamber comprises walls defining an internal space containing gas, and has in particular an upper wall, i.e. the wall which has an upward-facing external surface, which may be thought of as the "roof" of the chamber. The external dimensions of the upper wall of the chamber are adapted to the outline (the external dimensions) of the glass sheet, but as a rule are somewhat smaller than the external dimensions of the glass sheet to be supported, so that the glass sheet in the final position projects a few centimeters beyond the edge of the upper wall of the chamber on several, in particular on all sides, so that it can be taken up by an annular mould surrounding the chamber.

A device of the type mentioned at the outset is known from EP 0 578 542 B1. The apertures for the passage of gas are arranged there in lines in the upper wall of the chamber, whereby there are provided between neighbouring pairs of lines slot-shaped gas discharge channels, which lead from the upper side of the chamber through the chamber to its lower side and enable an undisturbed discharge of the gas of the gas cushion.

It has however been found that the optical properties of the glass sheets hereby achievable are capable of improvement, and the problem underlying the invention is therefore to achieve such an improvement.

To solve this problem, the device mentioned at the outset is characterised according to the invention in that the apertures for the passage of gas are designed as nozzles, which have an entry bore as well as a progressively widening exit hole with a nozzle exit area, and that the upper wall of the chamber has a larger degree of perforation (sum of all the nozzle exit areas in relation to the total area of the respective zone) in its edge zones than in its central zone.

The invention is based on the knowledge that the known device mentioned at the outset produces certain optical impairments of the glass sheets, which can be traced back to two phenomena which can even be locally superimposed.

On the one hand, the edges of the slot-shaped discharge channels form so-called cooling edges, which produce cooling shadows on the glass surface. On the other hand, so-called jet marks occur in the flow impact zone of the gas jets emerging from the apertures for the passage of gas. In both cases, it leads to a non-uniform cooling rate and thus to a non-uniform heat distribution, which results in a non-uniform stress distribution.

In order to avoid jet marks, it is known from EP 0 523 016 B1 to allow the gas jets to emerge from nozzles which have an entry bore as well as a progressively widening exit hole. These nozzles are formed by nozzle bodies which are screwed into the upper wall of the chamber and project upwards from the latter. The gas of the gas cushion is diverted downwards between the nozzle bodies and then guided away at the side. At their upper ends, the nozzle bodies thus form discharge edges, which also act as cooling edges and produce corresponding cooling shadows.

In contrast, neither jet marks nor cooling shadows occur according to the invention. The gas flow is slowed down during the passage through the nozzles with a corresponding pressure build-up, so that a large-area uniform gas exit can be guaranteed. Since the nozzles are integrated into the upper wall of the chamber, there is no gas deflection directed downwards at the nozzle exit, so that no discharge edges with a corresponding cooling effect are formed either. Furthermore, no entry bores from discharge channels are provided in the upper wall of the chamber. In this regard too, the creation of cooling shadows is thus eliminated.

The discharge of the gas of the gas cushion takes place horizontally between the glass sheet and the upper wall of the chamber. Surprisingly, it has been found that it is sufficient to reduce the degree of perforation in the central zone of the upper wall of the chamber in order to guarantee an undisturbed discharge of the gas of the gas cushion. Whilst being highly effective, this measure is extremely simple. The glass sheet retains its flat, horizontal alignment, without arching up in the central zone or forming sagging zones at the edges. An adverse effect on centring on the bending tools is thus ruled out.

Overall, the device according to the invention enables the production of bent glass sheets of the highest optical quality. This is of great importance, especially for the construction of motor vehicles. This is because here it is not only the demands on the shape tolerances of the glass sheets and their optical quality that are becoming increasingly strict, but there is also an increasing tendency to display information on the windscreen (head-up displays). The prerequisite for this is windscreens of the highest optical quality.

To advantage, the central zone of the upper wall of the chamber, which within the scope of the invention is decisive for determining the conditions for the degree of perforation, corresponds in the magnitude of its area roughly to the sum of the edge zones.

Particularly favourable results can be achieved when the ratio of the degree of perforation in the central zone of the upper wall of the chamber to the degree of perforation in the edge zones amounts to approx. 0.5 to 0.9, preferably approx. 0.7-0.8. It is understood here that the stated values are not to be understood as sharply defined limiting values, but that, in the individual case in particular, fairly large differences in the degree of perforation between the two zones may also be advisable. Tests have shown that the degree of perforation in the central zone of the upper wall of the chamber should as a rule amount to a maximum of approx. 0.3, preferably less than 0.25, in order reliably to avoid an undesirable upward arching of the glass sheet.

Furthermore, it is advantageous for the upper wall of the chamber to have a greater degree of perforation in the edge zones of its longer sides than in the edge zones of it shorter sides. Optimum adaptation to the geometrical conditions of the glass sheet thus arises. The smaller supporting requirement in the edge zones of the shorter sides is used to promote the discharge of the gas of the gas cushion.

The upper wall of the chamber will as a rule be designed to have rough mirror symmetry in order to simplify the design and production of the chamber. The degree of perforation to the left and right of a central axis of mirror symmetry will then be roughly in agreement. A further optimisation of the gas cushion function can however take place according to a preferred variant of the invention in that the degree of perforation diminishes from the glass-sheet feed side, which will normally be one of the short sides of the chamber, to the opposite side. Account can thus be taken of the fact that the glass sheet, when it is pushed into position over the upper wall of the chamber, pushes a gas cushion ahead of it, so that at the end of the transfer operation less and less gas has to be supplied from the chamber. As an alternative to this, a gas pressure diminishing from the feed side to the opposite side can also be provided for by a suitable adaptation of the nozzle cross-sections in the case of a degree of perforation which is symmetrical about the central mirror axis.

Each nozzle comprises an entry bore in communication with an exit hole, which is flared, i.e. it widens in the direction of flow. A uniform gas outflow with a low speed of flow is brought about by the widening exit hole of the nozzles. This effect can however be enhanced further if the entry bore of the nozzles widens at least once abruptly in the direction of flow.

It is particularly advantageous for the entry bore of the nozzles to have a first section with a diameter of approx. 2 to 4 mm, preferably of approx. 3 mm, as well as a second section with a diameter of approx. 20 mm, whereby the exit hole follows on from the latter. The entry bore can have a third section with a diameter of approx. 10 mm between the first and the second section. The first, second and third sections are preferably formed cylindrically and have coincident cylinder axes. The exit hole of the nozzles preferably widens conically up to the nozzle exit area with a diameter of approx. 60 mm. It goes without saying that the stated numerical values merely represent rough guidance values from which deviations are possible in both directions, without leaving the scope of the invention. The important thing is that the nozzles are designed in such a way that the gas strikes the glass surface without local pressure peaks, thereby avoiding jet marks.

In an important development of the invention, the upper wall of the chamber is covered by a thin porous cloth made of heat-resistant material. This cloth contributes in large measure to rendering the gas flow uniform over the area of the upper wall of the chamber. The cloth also forms an area of uniform temperature, which helps to render the cooling rate, the heat distribution and the stress distribution uniform. From this viewpoint, it is particularly advantageous for the cloth to be made of heat-conductive material, preferably of corrosion-resistant steel (stainless steel).

For the chamber, consideration can in principle be given to any sufficiently temperature-resistant material. Preferably, however, the chamber is made of ceramic material. Heating elements are preferably installed in the chamber, whereby consideration is given in particular to electric heating.

It was stated above that the first section of the entry bores should preferably have a diameter of approx. 3 mm. This value relates to ceramic chambers, since smaller diameters cannot be drilled in ceramics. When other materials are used for the chamber, it is possible to use smaller diameters if need be, as a result of which the supporting behaviour and the temperature distribution of the gas cushion can be designed even more favourably. Overall, however, the advantages of the ceramic design predominate.

Here, the chamber is preferably designed as a one-piece moulding.

Figure 2:
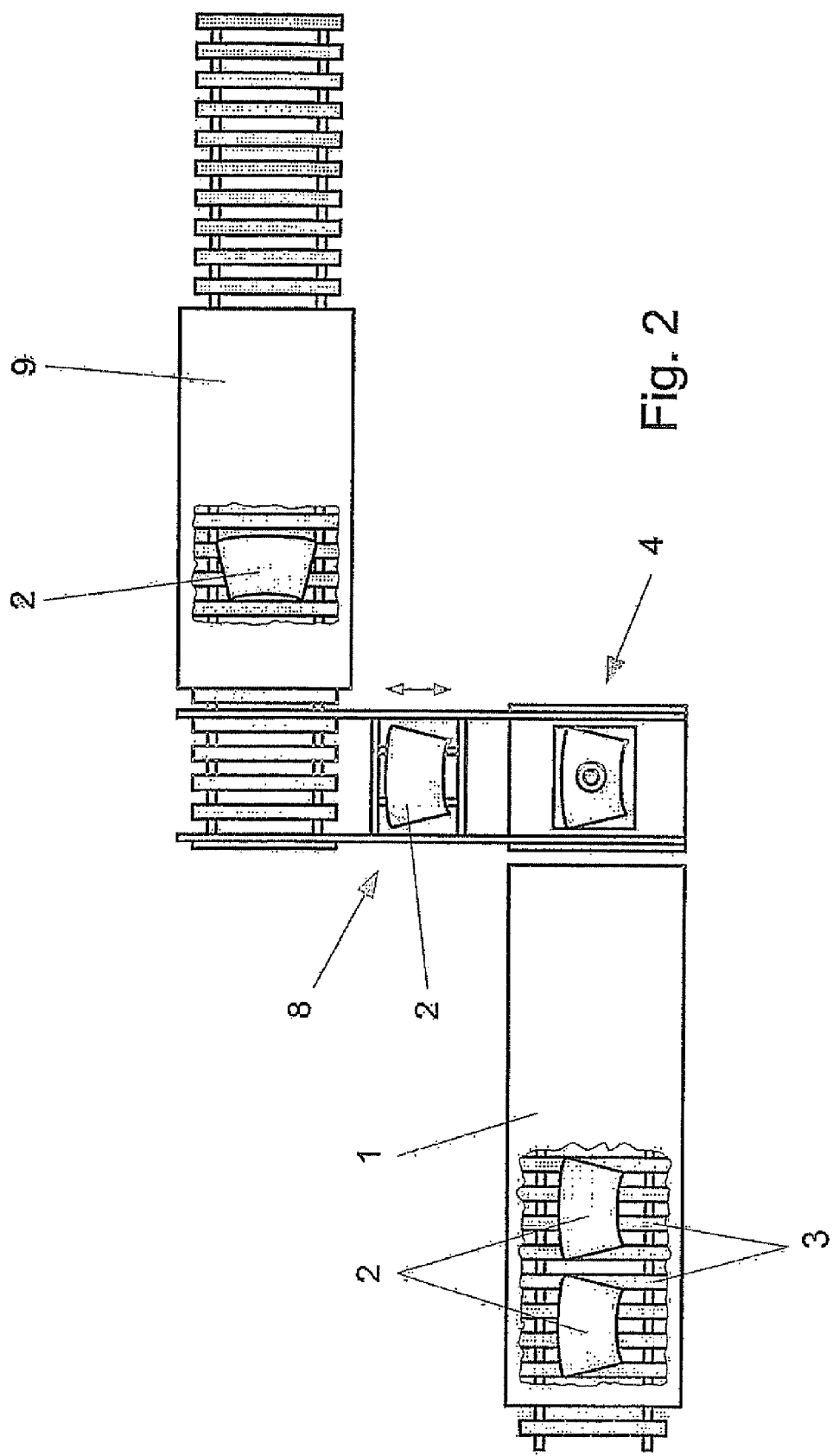
Figure 3:
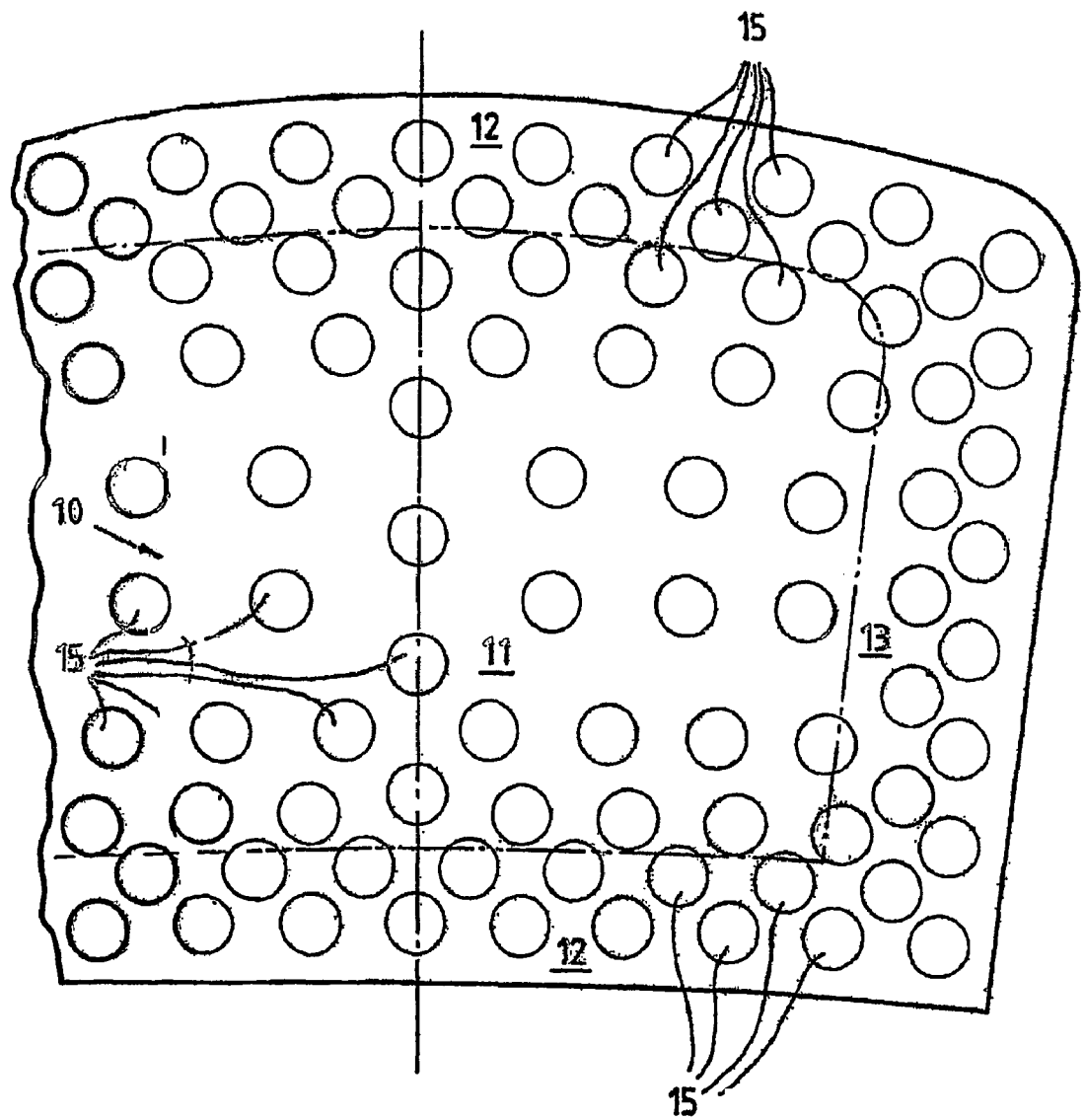
Figure 4:
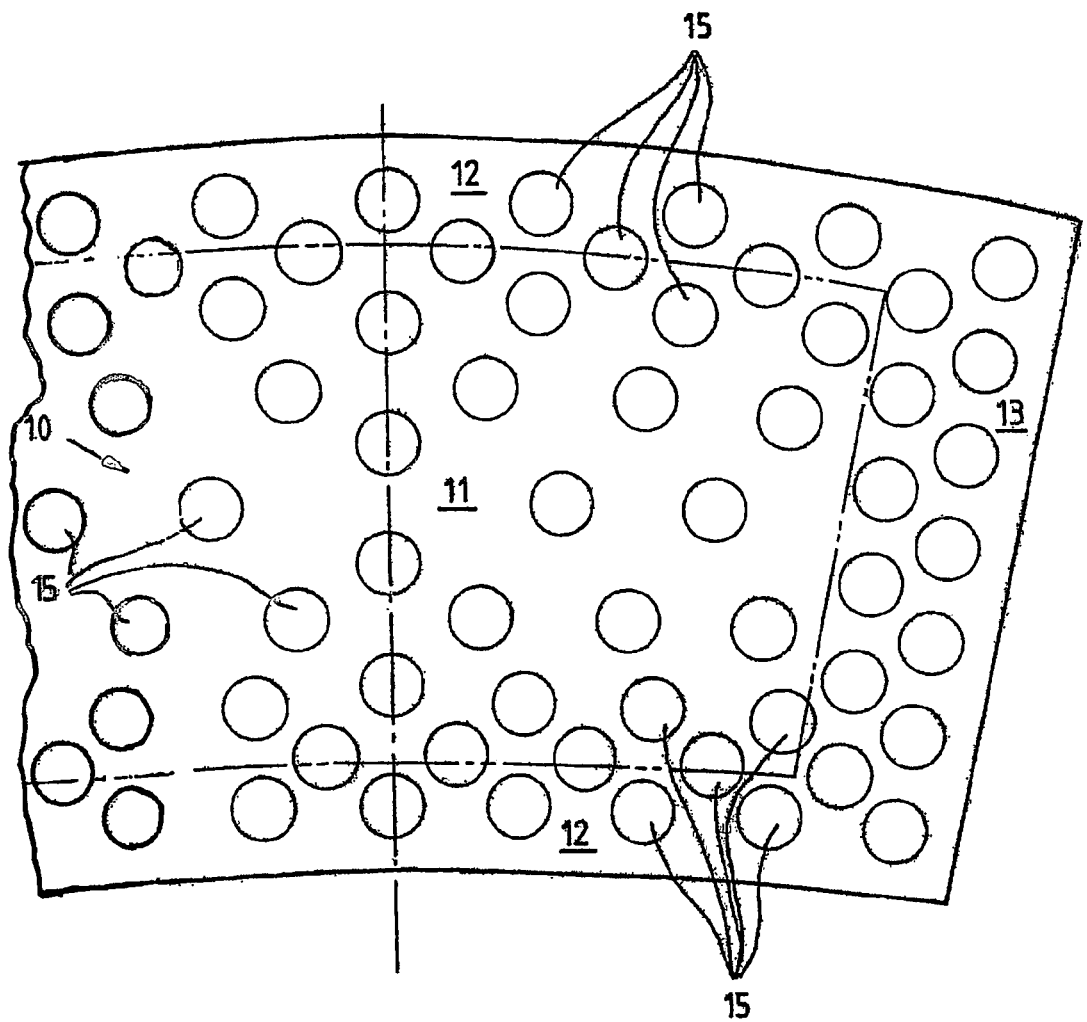
Figure 5:
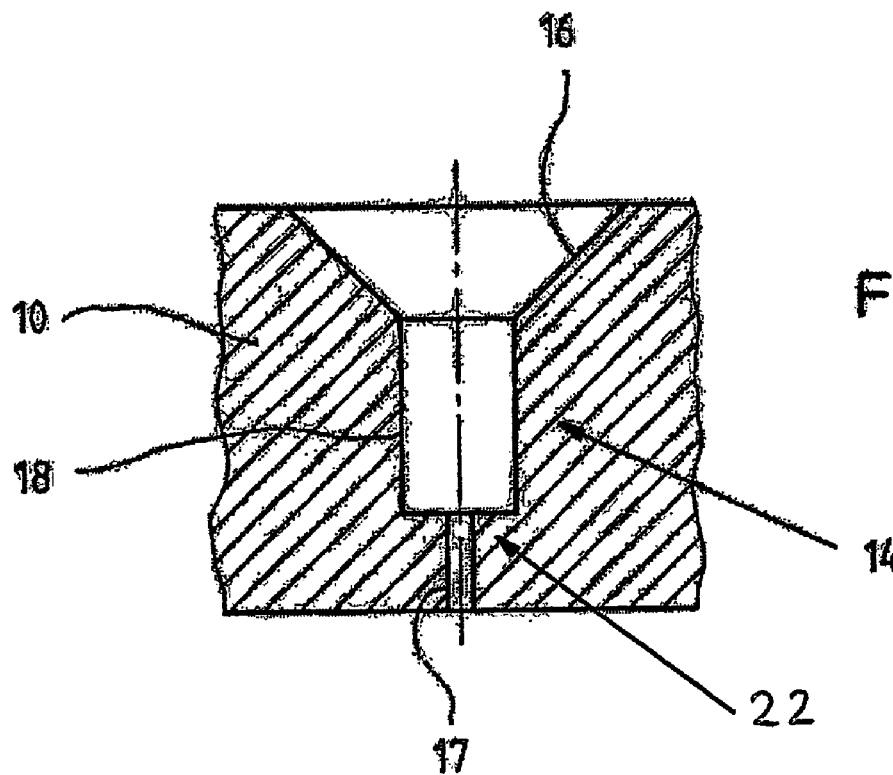
Figure 6:
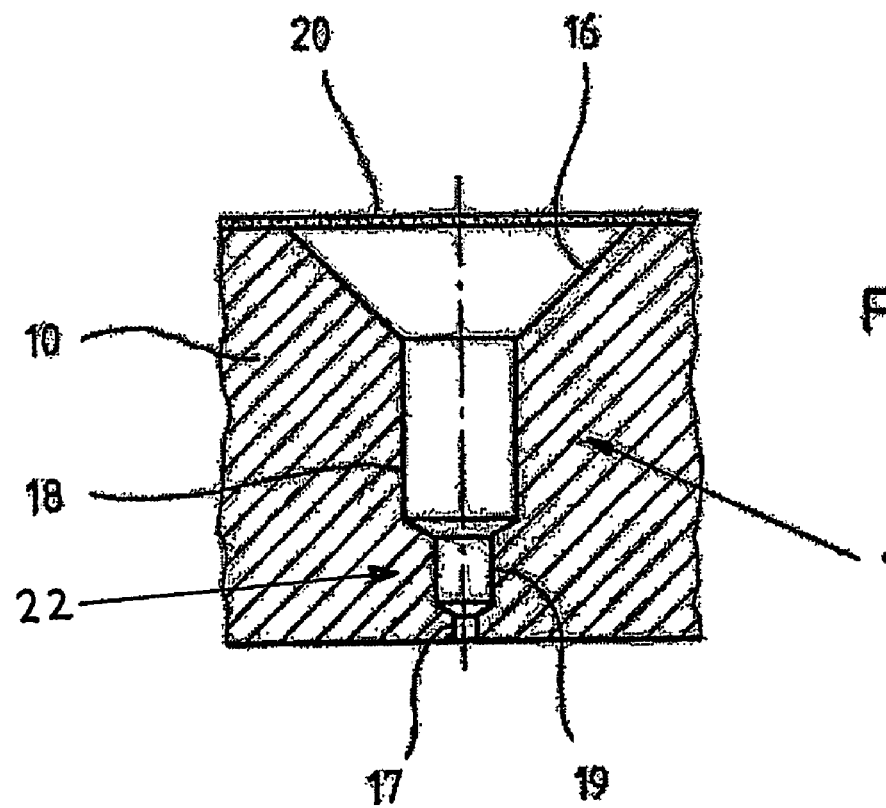

The invention will be explained in greater detail below with the aid of preferred examples of embodiment in connection with the appended drawings. The drawings show the following:

FIG. 1: in diagrammatic representation, a vertical section through a plant in which the device according to the invention is integrated;

FIG. 2: a plan view of the plant according to FIG. 1;

FIG. 3: a partial plan view of a first form of embodiment of the device according to the invention;

FIG. 4: a partial plan view of a second form of embodiment of the device according to the invention;

FIG. 5: a section through a first nozzle design;

FIG. 6: a section through a second nozzle design.

The plant according to FIGS. 1 and 2 has a preheating furnace 1, which serves to pre-heat glass sheets 2 of a glass-sheet pair. Glass sheets 2 advance through the furnace on rollers 3, whose spacing is reduced in the area of the furnace exit, since the heated glass sheets are deformable and therefore require more intensive support. Preheating furnace 1 is followed by a bending station 4, which is provided with a glass-bending mould 5 in the form of a ring, which conforms in outline and elevation to the desired shape of the glass sheet after bending, and a full surface contact vacuum mould 6.

The present invention relates especially to gas chamber 7 for producing the gas cushion, represented diagrammatically in FIG. 1. Chamber 7 has an upper wall 10, such as is shown in partial plan views in FIGS. 3 and 4, and is surrounded by the ring mould 5. The upper wall may also, in broad terms, conform in outline and elevation to the desired shape of glass sheet to be manufactured, allowing for the fact that, as previously noted, the chamber 7 is slightly smaller than the ring mould 5 (and hence also the glass sheet) so that the chamber may pass through the ring mould. Alternatively, the upper wall of the chamber may possess a shape which is a more general approximation of the shape of the bent glass sheet, and be used for the production of bent glass sheets for several different vehicles. If only a moderate degree of bending is required, the upper wall of the chamber may be flat.

Referring to FIG. 1, the chamber 7 serves to build up a gas cushion, being supplied with compressed gas (e.g. air) by a source of compressed gas which is diagrammatically represented and designated by reference numeral 21. Glass sheets 2 transfer onto this gas cushion as soon as they leave preheating furnace 1. Chamber 7 then descends and places respective glass sheet 2 onto ring mould 5. At the same time, the vacuum mould is conveyed downwards in order to engage respective glass sheet 2 by suction and to bring it into the desired shape. A transport device 8, e.g. a roller conveyor (FIG. 2), serves to convey bent glass sheets 2 into a lehr 9.

As shown in FIG. 3, the upper wall 10 of the chamber 7 has a central zone 11 as well as edges zones 12 and 13, the approximate boundary of which is indicated by a dashed boundary line. Edge zones 12 are assigned to the longer sides and edge zones 13 to the shorter sides. The area of central zone 11 roughly corresponds to the sum of the areas of edge zones 12 and 13, whereby the boundary of central zone 11 has a course which is geometrically similar to the course of the edge of upper wall 10 of chamber 7.

Nozzles 14 (FIG. 5 and 6) pass through upper wall 10 of chamber 7, only the nozzle exit areas 15 of which are shown in FIGS. 3 and 4. The degree of perforation of central zone 11 of wall 10 is smaller than the degree of perforation of edge zones 12 and 13. The degree of perforation is defined within the scope of the invention as the sum of the nozzle exit areas 15 of respective zone 11, 12, 13 in relation to the total area of this zone 11, 12, 13. The ratio of the degree of perforation of central zone 11 to the degree of perforation of edge zones 12 and 13 amounts in the present case to approx. 0.75 with a degree of perforation of the central zone of approx. 0.2.

The device according to the invention produces a uniform gas cushion, whereby the smaller degree of perforation in central zone 11 ensures that the gas can discharge undisturbed via the edge zones. Since nozzles 14 are integrated into wall 10 and discharge openings or slots in wall 10 are dispensed with, no cooling shadows can be formed-in glass sheets 2.

The form of embodiment according to FIG. 4 differs from that according to FIG. 3 by a somewhat different shape and otherwise by the fact that here the ratio of the degree of perforation of central zone 11 to the degree of perforation of edge zones 12 and 13 amounts to approx. 0.8, and with a degree of perforation of the central zone of approx. 0.25. No cooling shadows can occur here either for the reasons mentioned in connection with FIG. 3.

Furthermore, the design of the nozzles 14 themselves also ensures that jet marks are avoided. The first form of embodiment of the nozzle design is shown in FIG. 5. According to this, nozzle 14 has an entry bore 22 which widens abruptly in the flow direction and which is followed by an exit hole 16. The entry bore has a first cylindrical section 17, the diameter of which amounts to 4 mm in the present case. This is followed by a second cylindrical section 18 with a diameter of 20 mm. Proceeding from this, exit hole 16 widens conically to its nozzle exit area 15 with a diameter of 60 mm. This nozzle design is able to slow down the gas emerging from first section 17 with a corresponding pressure build-up and to distribute it via exit hole 16, with a further pressure build-up, uniformly over the respective area of the gas cushion.

The form of embodiment according to FIG. 6 differs from that according to FIG. 5 by the fact that first cylindrical section 17 of the entry bore 22 has a diameter of only 3 mm and that, between this section and second cylindrical section 18, there is provided a third cylindrical section 19 with a diameter of 10 mm, whereby short conical transition zones are provided between sections 17 and 19 and, respectively, 19 and 18. The smooth entry of the gas into the gas cushion is further assisted by this nozzle design.

Additionally, FIG. 6 shows the arrangement of a cloth 20 made of stainless steel, which serves additionally to render the gas flow uniform and above all to adjust a uniform temperature of the whole lower face of the gas cushion.

Chamber 7 is designed as a one-piece moulding made of ceramic. This restricts the minimum achievable diameter of first section 17 of the entry bore of nozzle 14 to approx. 3 mm. Other materials can also be used, possibly with the advantage that the diameter of first section 17 can be reduced further. Moreover, chamber 7 can be heated, in particular by electric heating elements installed close to or in wall 10 of chamber 7. This serves to achieve exact adjustment of the temperature of the gas cushion. The gas originates from a suitable source of compressed gas and is supplied already in the heated state.

The invention claimed is:

1. A device for producing a gas cushion for supporting a preheated glass sheet, comprising a chamber connected to a source of compressed gas, the chamber including an upper wall having an external surface dimensioned to the outline of the glass sheet and having a plurality of apertures for the passage of gas, wherein the apertures are designed as nozzles, each having an entry bore as well as a progressively widening exit hole and each being in fluid communication with the source of compressed gas so that the compressed gas passes first through the entry bore and then through the exit hole to produce the gas cushion which supports the preheated glass sheet above the external surface of the upper wall of the chamber, and that the external surface of the upper wall of the chamber has a greater degree of perforation (sum of exit areas of the exit holes in relation to total area) in edge zones of the external surface of the upper wall than in a central zone of the external surface of the upper wall which is completely surrounded by the edge zones.

2. The device according to claim 1, wherein the central zone roughly corresponds in the magnitude of its area to the sum of the edge zones.

3. The device according to claim 1, wherein the ratio of the degree of perforation in the central zone to the degree of perforation in the edge zones amounts to approx. 0.5 to 0.9.

4. The device according to claim 3, wherein the ratio of the degree of perforation in the central zone to the degree of perforation in the edge zones amounts to approx. 0.7-0.8.

5. The device according to claim 1, wherein the external surface of the upper wall of the chamber has a degree of perforation of at most approx. 0.3 in its central zone.

6. The device according to claim 5, wherein the external surface of the upper wall of the chamber has a degree of perforation of at most approx. 0.25 in its central zone.

7. The device according to claim 1, wherein the external surface of the upper wall of the chamber has a greater degree of perforation in the edge zones of its longer sides than in the edge zones of its shorter sides.

8. The device according to claim 1, wherein the degree of perforation of the external surface of the upper wall of the chamber diminishes from a feed side for the glass sheet to a side of the surface opposite the feed side.

9. The device according to claim 1, wherein the entry bore of at least one of the nozzles widens at least once abruptly in a direction of flow of the compressed gas.

10. The device according to claim 9, wherein the entry bore of the nozzles has a first section with a diameter of approx. 2 to 4 mm, as well as a second section with a diameter of approx. 20 mm, whereby the exit hole follows on from the second section.

11. The device according to claim 10, wherein the entry bore of the nozzles has a third section with a diameter of approx. 10 mm between the first and second section.

12. The device according to claim 11, wherein at least the first, the second and the third section are formed cylindrically.

13. The device according to claim 12, wherein at least the first, the second and the third section are formed with a coinciding cylinder axis.

14. The device according to claim 10, wherein the first section has a diameter of approx. 3 mm.

15. The device according to claim 1, wherein the external surface of the upper wall of the chamber is covered by a thin porous cloth made of heat-resistant material.

16. The device according to claim 15, wherein the cloth is made of heat-conductive material.

17. The device according to claim 16, wherein the cloth is made of corrosion-resistant steel (stainless steel).

18. The device according to claim 1, wherein the chamber is made of ceramic material.

19. The device according to claim 18, wherein the chamber is designed as a one-piece moulding.

20. The device according to claim 1, wherein the chamber is provided with heating elements.

21. A device positioned between a preheating furnace which produces a preheated glass and a lehr, for producing a gas cushion to support the preheated glass sheet exiting the preheating furnace, the device comprising a chamber connected to a source of compressed gas, the chamber including an upper wall having an external surface, the upper wall of the chamber possessing a plurality of apertures in fluid communication with the source of compressed gas, the apertures forming nozzles each having an entry bore as well as a progressively widening exit hole so that the compressed gas from the source of compressed gas passes first through the entry bore and then through the exit hole to produce the gas cushion supporting the glass sheet above the external surface of the upper wall at a position between a ring mould and a vacuum mould, and that the external surface of the upper wall of the chamber has a greater degree of perforation (sum of exit areas of the exit holes in relation to total area) in edge zones of the external surface of the upper wall than in a central zone of the external surface of the upper wall which is completely surrounded by the edge zones.

22. A method of processing a glass sheet comprising:

preheating the glass sheet to produce a preheated glass sheet;

advancing the preheated glass sheet toward a bending station comprised of a chamber possessing an upper wall having an external surface dimensioned to an outline of the preheated glass sheet, the upper wall of the chamber possessing a plurality of apertures in fluid communication with a source of compressed gas, the apertures forming nozzles each having an entry bore as well as a progressively widening exit hole, the external surface of the upper wall of the chamber having a greater degree of perforation (sum of exit areas of the exit holes in relation to total area) in edge zones of the external surface of the upper wall than in a central zone of the external surface of the upper wall which is completely surrounded by the edge zones;

supporting the preheated glass sheet on a gas cushion in the bending station, the gas cushion being produced by first passing the compressed gas from the source of compressed gas through the entry bore of the nozzles and then through the exit hole of the nozzles, the preheated glass sheet being supported on the gas cushion in the bending station so that the preheated glass sheet is supported above the external surface of the upper wall at a position between a ring mould and a vacuum mould in the bending station;

placing the preheated glass sheet on the ring mould, and moving the vacuum mould into engagement with the preheated glass sheet to bring the preheated glass sheet into a desired shape; and transporting the preheated glass sheet out of the bending station.

* * * * *